Oct. 1, 1968  R. W. PLUME  3,403,899
VISCOUS DAMPED BUSHING
Filed April 29, 1966
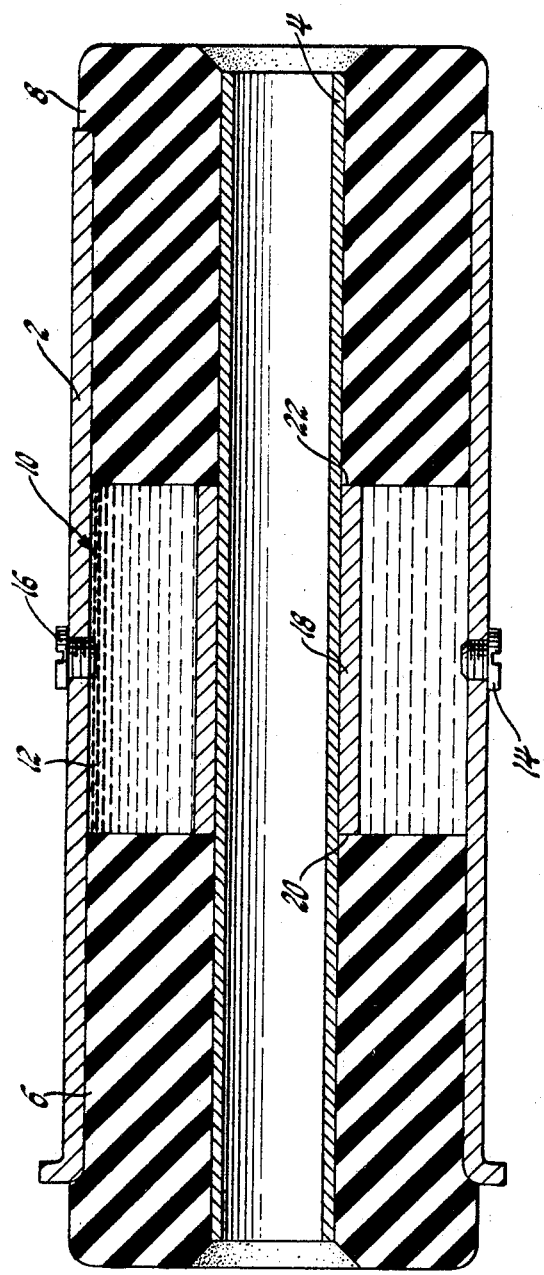
INVENTOR.
Robert W. Plume
BY
W. F. Wagner
ATTORNEY United States Patent Office 3,403,899
Patented Oct. 1, 1968

3,403,899
VISCOUS DAMPED BUSHING
Robert W. Plume, Utica, Mich., assignor to General
Motors Corporation, Detroit, Mich., a corporation of
Delaware
Filed Apr. 29, 1966, Ser. No. 546,323
4 Claims. (Cl. 267—35)

ABSTRACT OF THE DISCLOSURE

A bushing assembly having axially spaced annular elastic members disposed in compression between radially inner and outer metal cylinders to form a closed central annular void, with the void totally occupied by a viscous damping medium capable of affording significant resistance to high frequency relative deflection of the cylinders.

---

This invention relates to suspension arrangements and more particularly, although not exclusively to an improved bushing construction for elastically connecting various elements of vehicle suspension to the sprung and unsprung mass of the vehicle.

An object of the invention is to provide an improved elastic bushing construction.

Another object is to provide an elastic bushing construction incorporating means for damping certain deflection modes thereof.

A further object is to provide an annular bushing construction incorporating damping means which is effective primarily with respect to radial deflection of the bushing.

The foregoing and other objects, advantages and features of the invention will become more readily apparent as reference is had to the accompanying specification and sheet of drawings wherein the single figure is an enlarged longitudinal sectional view of a bushing construction incorporating the invention.

In the typical automotive vehicle suspension utilizing linkage for positioning and controlling the deflection path of the wheels, it is common to utilize annular elastic bushings as a part of the pivot assembly for such linkages. Such elastic bushings are also utilized in other forms of vehicle suspension such as for example trailing cantilever leaf spring suspension of the type shown in copending application Ser. No. 504,011, now Patent No. 3,345,060, Polhemus et al., assigned to the assignee of this invention.

Generally speaking, annular elastic bushings comprising an outer and an inner metal cylinder having compressed annular elastic elements disposed therebetween are well known in the prior art. While such bushings often utilize an annular elastic element which extends the full length of the metal cylinders, in an alternate form, two separate elastic elements may be inserted at opposite ends of the metal cylinder, and the combined length of the elastic elements may be less than the total length of the metal cylinders, thereby creating an annular void centrally of the bushing. This latter construction is particularly probable in vehicle suspension utilizing fiberglass reinforced plastic spring elements such as that shown in the previously noted application Ser. No. 504,011. Since the typical spring of this type usually exhibits uniform cross-sectional area from end to end, the terminal portions thereof are often quite wide in relation to thickness with the result that a relatively long bushing constructon is indicated. However, since the total length of the bushing appropriate to the width of the spring, if occupied fully by a continuous annular elastic element, would produce an undesirably high radial deflection rate, in practice, two relatively short annular elastic elements are utilized after the manner shown in the previously mentioned application, in order to achieve the desired radial deflection rate.

Howevr, in the foregoing and other suspension constructions utilizing annular rubber bushings in association with pivotal mounting members, the designer is frequently faced with a conflicting requirement in terms of radial deflection rate for various operational conditions experienced by the vehicle. For example, in some instances, such bushings should preferably exhibit greater resistance to fore and aft deflections than to vertical deflections in order to improve vehicle shake characteristics.

To accomplish the foregoing objectives in accordance with the present invention, as seen in the single figure of the drawing, a bushing is provided wherein an outer metal cylinder 2 is arranged in concentric surrounding relation with an inner metal cylinder 4 with the annular space therebetween being partially occupied by elastomeric annular elements 6 and 8 which extend axially inwardly between each cylinder member less than half the total length of the members, thereby forming a closed annular void 10 therebetween. It will be understood that in use the metal cylinders are connected respectively to the sprung and unsprung mass of a vehicle. In accordance with the principal feature of the invention, the annular void 10 is totally occupied by a viscous damping medium 12 which remains entrapped therein due to the sealing action of elastic elements 6 and 8. In operation, damping medium 12 exhibits minimal influence on low frequency relative deflection of cylinders 2 and 4, but a significant damping effect with respect to high frequency relative deflection such as is characteristic of vehicle shake.

According to another feature of the invention, the outer cylinder 2 is provided with removable threaded closures 14 and 16 which enable the introduction of an appropriate viscous damping fluid into the void 10 after assembly of the elastic elements 6 and 8 into the positions illustrated.

In an alternative construction, the damping medium 10 may be in semi-solid form such as plastic putty enabling positioning thereof longitudinally centrally between the cylinders 2 and 4 prior to assembly of the elastic elements. Naturally, in this form, the threaded closures 14 and 16 may be omitted.

According to a further feature of the invention, the inner cylinder 4 has an outer sleeve member 18 press fitted thereon to a position longitudinally midway between its opposite ends to provide circumferential shoulders 20 and 22 which define the axial inward limits of the annular elastic members 6 and 8. Additionally, by varying the outer diameter of sleeve 18, a convenient means of varying the volume of void 10 is provided, with the result that the amount of damping achieved with any given damping medium may be correspondingly varied.

From the foregoing it will be seen that a novel and improved bushing construction has been provided which affords great flexibility in terms of modifying the deflection characteristics of a conventional annular bushing. It will be evident that variation in both the volume occupied by the damping medium as well as the selection of damping medium enable the production of bushings ideally suited to a wide range of design requirements. Of particular importance is the fact that the invention may be utilized or omitted in a given bushing construction and thereby possesses the singular advantage of being readily applied to existing bushing constructions.

While but one embodiment of the invention has been shown and described, it will be apparent that other changes and modifications may be made therein. It is, therefore, to be understood that it is not intended to limit the invention to the embodiment shown, but only by the scope of the claims which follow.

I claim:
1. A bushing comprising an inner cylindrical member and an outer cylindrical member, a plurality of annular elastomeric elements disposed in axially spaced relation between said members yieldably maintaining the same in concentric relation, and fluid damping means totally occupying the space between said members bounded by the opposed extremities of said elements.

2. A radially damped bushing comprising inner and outer cylindrical members, annular elastic elements disposed between said members extending inwardly from opposite ends thereof less than half the length thereof, and a quantity of viscous damping medium totally occupying the space between said members bounded by the inner extremities of said elements.

3. The structure set forth in claim 2 including means formed in the wall of one of said members enabling injection of said damping medium.

4. The structure set forth in claim 2 wherein said inner cylindrical member includes a sleeve portion forming axially opposite circumferential shoulders defining the axially inward limits of said elastic elements.

References Cited

UNITED STATES PATENTS 3,055,687   9/1962   Hutton _____ 267—57.1

ARTHUR L. LA POINT, *Primary Examiner.*

R. M. WOHLFARTH, *Assistant Examiner.*